US012106157B1

(12) United States Patent
Sultania et al.

(10) Patent No.: US 12,106,157 B1
(45) Date of Patent: Oct. 1, 2024

(54) MEMORY EFFICIENT AND SCALABLE APPROACH TO STIMULUS (WAVEFORM) READING

(71) Applicant: Synopsys, Inc., Sunnyvale, CA (US)

(72) Inventors: Anup Kumar Sultania, Plano, TX (US); Ajay Singh Bisht, San Jose, CA (US); Mark W. Brown, Little Elm, TX (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 18/344,672

(22) Filed: Jun. 29, 2023

Related U.S. Application Data

(63) Continuation of application No. 17/224,382, filed on Apr. 7, 2021, now Pat. No. 11,734,080.

(60) Provisional application No. 63/006,639, filed on Apr. 7, 2020.

(51) Int. Cl.
    *G06F 9/50* (2006.01)
(52) U.S. Cl.
    CPC .................................. *G06F 9/5061* (2013.01)
(58) Field of Classification Search
    CPC ................................................... G06F 9/5061
    See application file for complete search history.

(56) References Cited

U.S. PATENT DOCUMENTS

| | | | | |
|---|---|---|---|---|
| 9,470,756 | B1* | 10/2016 | Wilcox | G01R 31/318563 |
| 2013/0058365 | A1* | 3/2013 | Wagner | G01M 11/3127 372/20 |
| 2015/0089289 | A1* | 3/2015 | Gahoi | G06F 11/27 714/30 |
| 2015/0302126 | A1* | 10/2015 | Hamid | G06F 11/3688 716/136 |
| 2017/0255727 | A1* | 9/2017 | Liu | G06F 30/331 |
| 2018/0183733 | A1* | 6/2018 | Dcruz | G06F 3/0679 |
| 2021/0006492 | A1* | 1/2021 | Yan | H04L 45/42 |
| 2021/0208842 | A1* | 7/2021 | Cassidy | G11B 27/28 |

* cited by examiner

*Primary Examiner* — Sisley N Kim
(74) *Attorney, Agent, or Firm* — Fenwick & West LLP

(57) ABSTRACT

Embodiments relate to reading signals from a stimulus file produced by an emulator into a data store. A method includes executing, by a set of one or more worker processes, reading tasks. Each reading task is executable independent of other reading tasks. Each reading task includes reading a time slice of a signal from a stimulus file produced by a hardware emulator, and pushing a partial waveform corresponding to the time slice to a data store. The partial waveform includes a head and a tail that each has a smaller data size than an entirety of the partial waveform. The method further includes executing stitching tasks. The stitching tasks include pulling the heads and tails of the partial waveform from the data store, modifying the heads and tails to indicate a temporal order of the partial waveforms, and pushing the modified heads and tails back to the data store.

19 Claims, 10 Drawing Sheets

MEMORY EFFICIENT AND SCALABLE APPROACH TO STIMULUS (WAVEFORM) READING

RELATED APPLICATION

This application is a continuation of U.S. patent application Ser. No. 17/224,382, "Memory Efficient and Scalable Approach to Stimulus (Waveform) Reading," filed Apr. 7, 2021; which claims the benefit of U.S. Provisional Application No. 63/006,639, "Memory Efficient Approach to Stimulus (Waveform) Reading Enabling Cloud Scalability", filed Apr. 7, 2020. The contents of all of the foregoing are incorporated by reference in their entirety.

TECHNICAL FIELD

The present disclosure relates to reading waveforms produced by a hardware emulator or software simulator.

BACKGROUND

One step in the manufacture of semiconductor wafers involves verification. In a typical verification process, an emulator including a set of programmable devices such as Field Programmable Gate Arrays (FPGAs) emulates a circuit design. The emulation results include data of signals traced during the emulation. The data is stored in a stimulus file and may be processed as waveforms. Stimulus files can be very large (e.g., in tens of terabyte range) and thus difficult to read for analysis tools. For example, reading from a stimulus file has a high runtime and high memory footprint.

SUMMARY

Embodiments relate to reading waveforms from a stimulus file produced by a hardware emulator into a data store. In some embodiments, a method includes executing, by a set of one or more worker processes, reading tasks. Each reading task is executable independent of the other reading tasks. Each reading task includes reading a time slice of a signal from the stimulus file, and pushing a partial waveform corresponding to the time slice to the data store. The partial waveform includes a head and a tail that each has a smaller data size than an entirety of the partial waveform. The method further includes executing stitching tasks. The stitching tasks include pulling the heads and tails of the partial waveform from the data store, modifying the heads and tails to indicate a temporal order of the partial waveforms, and pushing the modified heads and tails back to the data store.

In some embodiments, executing each reading task includes sequentially reading different temporal portions of the time slice from the stimulus file into a buffer for the worker process as waveform segments, and pushing the waveform segments from the buffer to the data store. The waveform segments may be pushed from the buffer to the data store, responsive to an amount of data read into the buffer for each waveform segment reaching a threshold data size.

In some embodiments, a system includes one or more worker processes and a master process. The one or more worker processes are configured to execute the reading tasks and the stitching tasks. The master process is configured to generate the reading tasks and stitching tasks and may assign the reading and stitching tasks to the worker processes.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to a memory efficient and scalable approach to stimulus (waveform) reading. In the chip design process, hardware or software emulators may be used to emulate the operation of an integrated circuit being designed. Files that capture the waveforms generated by these hardware emulators may then be used to verify the functionality of the circuit designs. These files are often referred to as stimulus files. Here, "stimulus" does not imply that the captured waveforms must be input waveforms: they may also be output waveforms or intermediate waveforms.

As an example, accurate power estimation in the early stages of a design cycle is important to ensure successful chip tape-out. Power consumption is strongly dependent on the testbench used to activate the chip. Rather than an artificial software load, an actual software workload that drives a system on chip (SoC) is preferred to capture a more accurate power profile of the SoC. The Linux boot-up sequence is a good example of a software workload. A hardware emulator may be used to emulate the operation of the SoC and the Linux boot-up sequence may then be run on the emulator to estimate the power profile of the SoC. The hardware emulation produces a stimulus file, which capture the waveforms of various signals on the SoC in response to the software workload. However, such a stimulus file typically has a large data size, which may be in the tens of terabyte range. Power analysis tools may struggle to read a very large stimulus file. Reading the stimulus file has a high runtime and a large memory footprint, thus requiring machines with large memory capacity.

Figure 10:
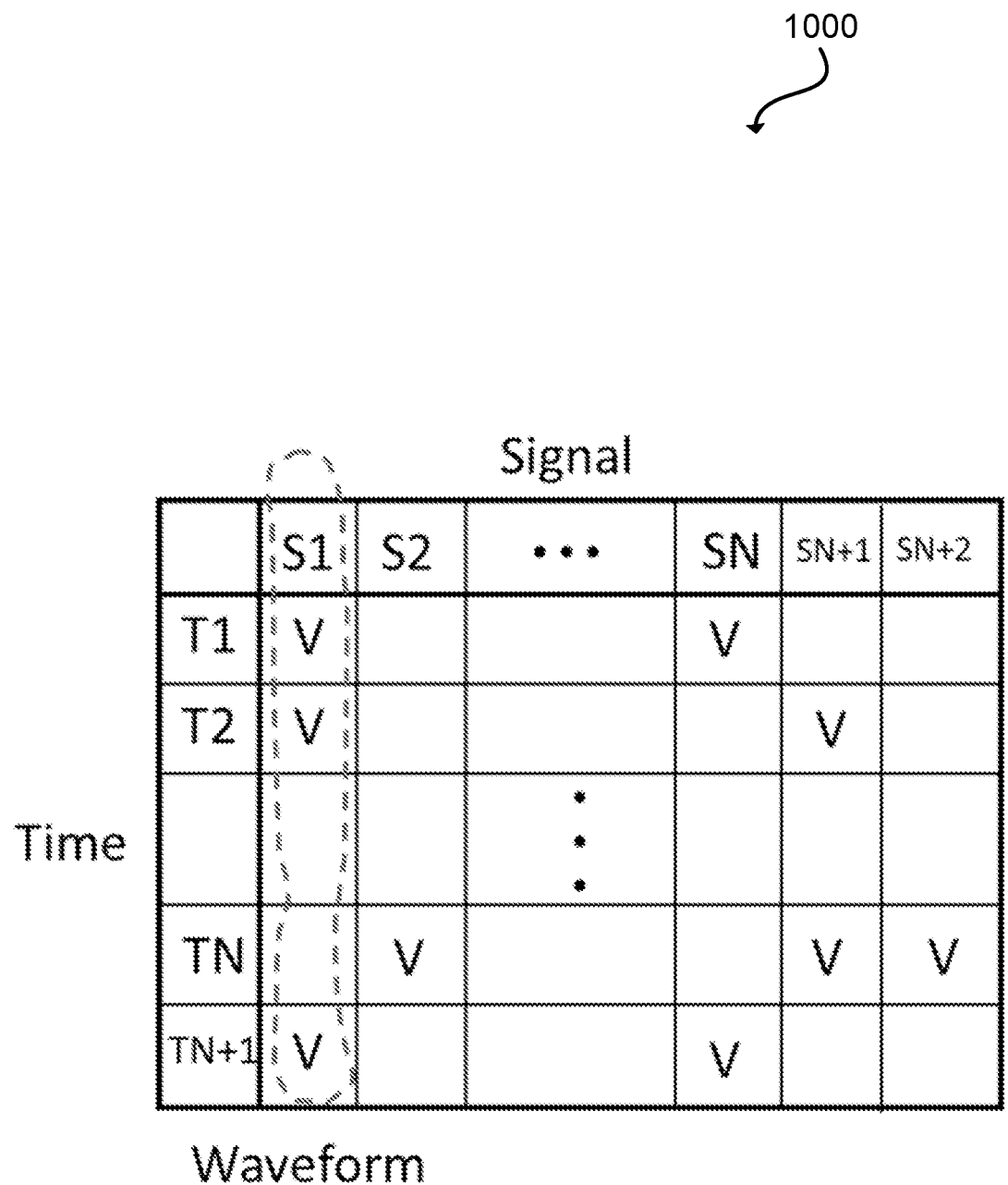
FIG. 10 depicts a storage layout of a stimulus file in accordance with some embodiments of the present disclosure.

FIG. 10 depicts a storage layout 1000 for a stimulus file viewed as a two-dimensional table. For efficient high-speed simulation, the stimulus file is optimized for speed. This may be accomplished by streaming the signal value changes to a persistent storage medium, such as a file, as simulation time advances until simulation terminates. The stimulus file has a time-ordered or time-major file format. For each significant simulation time for which values are changing, only those values for the signals that have changed at this time are stored in the stimulus file. Then the simulation time advances to the next significant time at which signal values change and those values are recorded. This process continues until simulation is complete.

Here, each significant simulation time T1 through TN+1 is represented as a row in the table. The signals are represented as columns in the table. Signal data for a signal (waveform) is a collection of the values over time (row) for a single signal (column). A signal value recorded for a significant simulation time is shown by "V" while no value is shown if there is no change in the signal value from the signal value in a prior significant simulation time. As shown for the signal S1, for example, there is a value at time T1 and T2 because of value changes corresponding to these times. However, there is no value at time TN because the value of the signal S1 at time TN is the same as the value of the signal S1 at a time prior to TN.

Reading the time-ordered stimulus file for a single signal (waveform) includes reading one row (e.g., each row corresponding to one significant simulation time T1 through TN+1) at a time, and thus includes reading almost the entire file. Analysis operations that use stimulus data, such as waveform viewing and power calculation, usually access the data in terms of waveforms and may read the same waveform multiple times. Therefore, reading waveforms multiple times or randomly accessing waveforms would require the time-ordered stimulus file to be almost entirely read many times. This would be intractable using 10 TB files.

As such, the dimensions of the table representation of the storage layout 1000 may be transposed so that the major dimension (row) is signal-based where the values of a single signal over time are contiguous in storage. In this manner they may be accessed quickly and efficiently by analysis tools. This transposition is performed by reading the time-ordered stimulus file collecting the values of the individual signals once and storing the waveform results corresponding with the signals in a different persistent storage. This reorganization allows direct access to individual waveforms of the signals.

This disclosure relates to a memory efficient and scalable approach to reading signal data from stimulus files, for example to a cloud-based data store, to facilitate direct access to individual waveforms. In one approach, the signal data in the stimulus file are segmented into a series of time slices. A master process creates a set of reading tasks, each of which reads a time slice from the stimulus file and pushes a part of a waveform (or set of waveforms) to the data store. The master process assigns the reading tasks to different worker process(es). The execution of one reading task is not dependent on the execution of other reading tasks. As a result, the reading tasks may be performed independently, and the worker processes may work independently of each other. The partial waveforms (time slices) are pushed to the data store in a form that includes a head and a tail. The head refers to a beginning portion of a partial waveform and the tail refers to an end portion of the partial waveform. The head and tail are each much smaller in size than the full partial waveform.

The different partial waveforms pushed to the data store are then stitched together using these heads and tails. The heads and tails are pulled from the data store, which takes less time and resources than pulling the entire partial waveform. The heads and tails are modified to indicate a temporal order of the partial waveforms. For example, the tail of partial waveform #1 may be modified to point to the head of partial waveform #2, and so on. These modified tails and heads are pushed back to the data store, thus linking all of the partial waveforms.

In another aspect, the worker processes may also subdivide an individual reading task into smaller pieces, for example due to size limitations on their local buffers. Rather than reading and pushing the entire partial waveform to the data store, the worker process may read signal data for the partial waveform from the stimulus file as a sequence of smaller pieces and push the smaller pieces of the partial waveform (referred to as waveform segments) to the data store one waveform segment at a time. In one approach, a worker process starts to read data from a time slice into its local buffer. When the data in the buffer reaches a threshold data size, the data is pushed to the data store as a waveform segment, freeing the buffer to read in the next waveform segment. The head and tail approach described above may also be used to stitch together the waveform segments. When a waveform segment is pushed to the data store, its head and tail portions are retained by the worker process. They are stitched to the head or tail portion of the next waveform segment and then pushed to the data store.

The data store then stores the full waveform as a series of waveform segments, where the tail of one waveform segment is stitched (e.g., points to) the next waveform segment. In one approach, the worker processes perform the stitching at boundaries within one time slice and the master process tracks the stitching required for boundaries between time slices (although the worker process may perform the actual stitching).

As a result, the required memory capacity of the worker processes is reduced and data transmission to and from the data store is also reduced. In particular, the reading of each partial waveform as multiple waveform segments reduces the required memory size of the worker processes because the buffer of each worker process only has to store smaller waveform segments and may be flushed each time a waveform segment is pushed to the data store. Furthermore, the stitching of the partial waveforms into the complete waveform by transferring only the heads and tails of the partial waveforms (and not the larger body portions of the partial waveforms) between the master process and the data store reduces the amount of data that must be transferred. If the data store is a cloud data store connected to the master process via a network, cloud scalability of partial waveform stitching process is improved.

Figure 1:
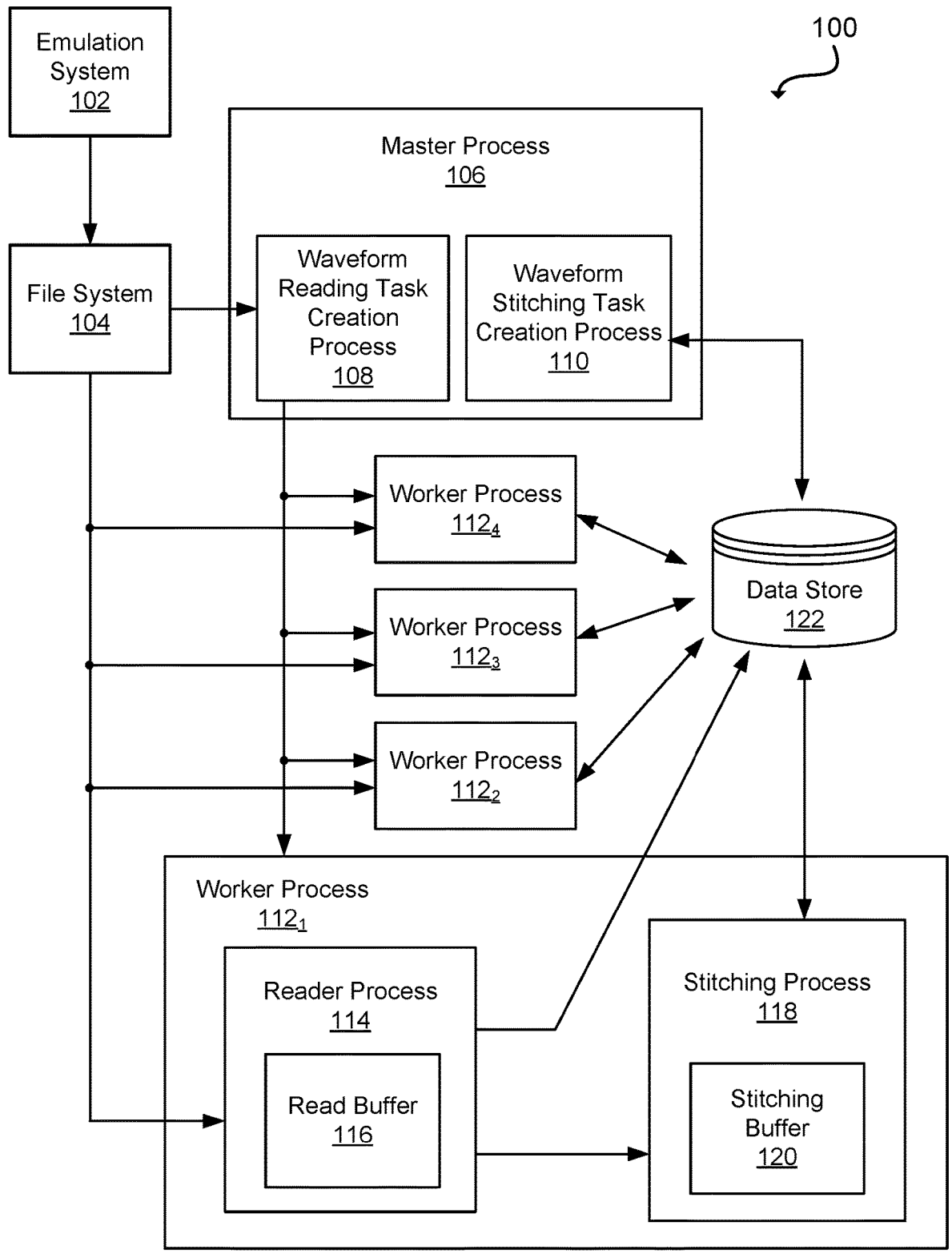
FIG. 1 depicts a diagram of an example waveform reading system in accordance with some embodiments of the present disclosure.

FIG. 1 depicts an abstract diagram of an example waveform reading system 100. The waveform reading system 100 includes a hardware emulation system 102, a file system 104, a master process 106, worker processes $112_1$ through $112_4$ (individually referred to as worker process 112), and a data store 122. The emulation system 102 emulates the operation of an integrated circuit being designed to generate a stimulus file including waveforms. The stimulus file is stored in the file system 104. The master process 106 and worker processes $112_1$ through $112_4$ work together to read the waveforms of the stimulus file from the file system 104 and provide the waveforms to the data store 122.

The master process 106 includes a waveform reading task creation process 108 and a partial waveform stitching task creation process 110. The waveform reading task creation process 108 creates reading tasks based on the stimulus file produced by the emulation system 102 and stored in the file system 104. The stimulus file may include multiple signals that are each separated into time slices. For each signal, each time slice corresponds to a partial waveform of a complete waveform that is generated from data of the signal. Each reading task includes reading a time slice of a signal from the stimulus file, and pushing a partial waveform corresponding with the time slice to the data store 122. Each partial waveform includes a head, a body, and a tail. The data of each partial waveform is mostly in the body. Each of the head and tail has a (much) smaller data size than the entire partial waveform.

The reading tasks created by the waveform reading task creation process 108 use a time-based approach for reading waveforms from the stimulus file. The entirety of the waveforms for a multiplicity of signals is too large to push to the data store as a single task. In a time-based approach, the waveforms are subdivided into partial waveforms according to time slices. Each time slice typically includes the waveforms for multiple signals. However, all of the time slices are required to reconstruct the entire waveform, as may be desirable for certain processing. Each reading tasks reads the corresponding time slice from the file system and pushes it to the data store 122.

The waveform reading task creation process 108 may place the reading tasks in a queue. Whenever a worker process 112 is free, the next task in the queue is assigned to the worker. The reading tasks may be evenly distributed across the worker processes 112, or assigned in some other way. Multiple worker processes 112 may execute the reading tasks in parallel. The number of worker processes 112 in the waveform reading system 100 may vary. In some embodiments, each of the worker processes 112 is assigned reading tasks for multiple waveforms for a single time slice. Each reading task is executable independent of the other reading tasks, with the partial waveforms from the reading tasks being combined into complete waveforms using separate stitching tasks. The reading tasks may be executed in various orders and are not necessarily executed according to temporal order.

The waveform stitching task creation process 110 creates stitching tasks for combining the partial waveforms into complete waveforms. The stitching tasks may be created dynamically when execution of reading tasks finish and combinable partial waveforms are stored in the data store 122. The stitching tasks may also be performed by the worker processes 112. The waveform stitching task creation process 110 may place the stitching tasks in a queue, and the worker processes 112 may be assigned the stitching tasks or otherwise receive the stitching tasks from the queue.

As shown for the worker process $112_1$, each worker process 112 includes a reader process 114, a read buffer 116, a stitching process 118, and a stitching buffer 120. The read buffer 116 and stitching buffer 120 may be data storage (e.g., memory) that is local to the worker process 112 and store information that facilitates execution of the reading and stitching tasks. To execute a reading task, the reader process 114 reads a time slice of a waveform from the stimulus file stored in the file system 104. The time slice is stored in the read buffer 116 and pushed as a partial waveform corresponding to the time slice to the data store 122. Reading the time slice may include reading the recorded data values of the signal for significant times within stimulus file and generating data values for the partial waveform for significant times that do not include recorded data values in the stimulus file. Because only data values for signals that have changed at a significant time from a prior significant time are stored in the stimulus file, each missing data value in the stimulus file may be determined from a recorded data value of a prior significant time.

In some embodiments, the worker process 112 for each reading task provides the partial waveform to the data store 122 using multiple phases, where a waveform segment of the partial waveform is provided to the data store 122 in each phase. For a reading task, the reader process 114 sequentially reads different temporal portions of the time slice from the stimulus file into the read buffer 116 for the worker process 112 as the waveform segments. The reader process 114 pushes the waveform segments from the read buffer 116 to the data store 122. Each waveform segment may be pushed from the read buffer 116 to the data store 122 in response to the amount of data read into the read buffer 116 for the waveform segment reaching a threshold data size.

In some embodiments, the threshold data size is reached when the amount of data read into the read buffer 116 exceeds the threshold data size within a tolerance limit. For example, the threshold data size may be a soft threshold of 4 GB. The read buffer 116 may include memory pools to avoid memory fragmentation. After a predefined percentage of the waveform (e.g., 5%) is read into the read buffer 116, the reader process 114 checks the read buffer 116 to determine whether the threshold data size has been reached. If the threshold data size has been reached, then the (e.g., body portion) of the waveform segment is pushed to the data store 122. The predefined percentage value, for example 5%, determines how much tolerance is allowed for the portion of the time slice in the read buffer 116 to go beyond the threshold data size, and may be adjustable. Using the tolerance limit may be advantageous because it is runtime intensive to use a hard limit for the threshold data size. The threshold data size may also be adjustable. For example, the threshold data size may be increased for machines with larger memory capacity or reduced for machines with smaller memory capacity. By pushing waveform segments in multiple phases, the reading tasks of the worker process 112 may execute on machines with smaller memory size (e.g., 64 GB of memory). In some embodiments, each worker process executes on a cluster of machines of a cloud computing infrastructure, where each machine has 64 GB of memory.

For the reading tasks, the stitching process 118 combines waveform segments into a complete partial waveform. The stitching process 118 stitches together tail portions and head portions of temporally adjacent waveform segments. In one example, when a waveform segment is flushed from the read buffer 116, the head and tail portions of the waveform segment are cached in the stitching buffer 120. The head portion of the waveform segment is stitched with the tail portion of a previous waveform segment (if available), then the tail portion of the previous waveform segment stored in the cache is pushed to the data store 120 along with the body portion of the current waveform segment. The head portion of the previous waveform segment may in the cache along with the tail portion of the previous waveform segment, and both the head and tail portions of the previous waveform segment may be pushed to the data store 120 together. The stitching of the head portion of the current waveform segment with the tail portion of a previous waveform segment may include modifying the tail portion of the previous waveform segment to point to the head portion of the current waveform segment. In the next phase, the tail portion of the waveform segment is stitched with a head portion of the subsequent waveform segment (if available), and the head and tail portions of the waveform segment are pushed to the data store 122. This process is repeated for multiple phases to stitch together all the waveform segments of the partial waveform. The worker process 112 keeps track of the head and tail portions while executing the phases and does not need to pull head and tail portions from the data store 122.

The master process 106 and the worker processes 112 may be implemented using one or more computing devices. The data store 122 may be connected to the worker processes 112 and master process 106 via a network (e.g., including the Internet). In some embodiments, the master process 106 and each of the worker processes 112 are separate computing devices. In some embodiments, the master process 106 and worker processes 112 execute in a cluster of computing devices of a cloud computing infrastructure. The master process 106 and each worker process 112 may execute on a virtual machine of the cloud computing infrastructure. The cloud computing infrastructure may be connected to the file system 104 via a network.

For the stitching tasks, the stitching process 118 may pull the heads and tails of the partial waveforms from the data store 122, modify the heads and tails to indicate a temporal order of the partial waveforms, and push the modified heads and tails back to the data store 122. For each stitching task, the tail of an earlier partial waveform is modified to point to the head of the next waveform segment.

Partial waveforms may be subdivided into waveform segments. The head and tail of a partial waveform may include a head portion of a first waveform segment in a sequence of waveform segments of the partial waveform and a tail portion of a last waveform segment in the sequence. Only the head and tails of the partial waveforms need to be pulled from the data store 122 for the stitching tasks. The body of the partial waveforms, which make up most of the data of the waveform segments and may include all portions of the partial waveform except the head portion of the first waveform segment of the partial waveform and the tail portion of the last waveform segment of the partial waveform, do not need to be pulled from the data store 112. As such, the data transmission to and from the data store 122 for the stitching tasks may be reduced. In some embodiments, the stitching tasks for combining partial waveforms are performed by the master process 106 rather than the worker processes 112.

The data store 122 stores the waveforms of the stimulus file. The data store 122 may be a cloud data store that is implemented across multiple computing devices. In the data store 122, the head and tail of each partial waveform may be kept in one or more separate memory packets from the body of the partial waveform. The memory footprint of the heads and tails is very small. This allows for faster pull and push of data from the data store 122 when performing the stitching tasks. For example, if waveform data is 1 TB and the head and tails are around a few MBs combined, by tracking heads and tails in separate memory packets, a much smaller amount of data is pulled and pushed to perform the stitching tasks. As such, separating the heads and tails into separate memory packets from the body of the partial waveforms provides for improved scalability. In some embodiments, the head portion and tail portion of each waveform segment may be kept in one or more separate memory packets from the body portion of the waveform segment.

The waveforms in the data store 122 may use a table representation that is transposed from the table representation of the signals in the stimulus file. In particular, the major dimension (e.g., row) may be signal-based, where values of a waveform corresponding to a single signal over time are contiguous in storage. As such, the waveforms stored in the data store may be accessed quickly and efficiently by analysis tools.

Figure 2:
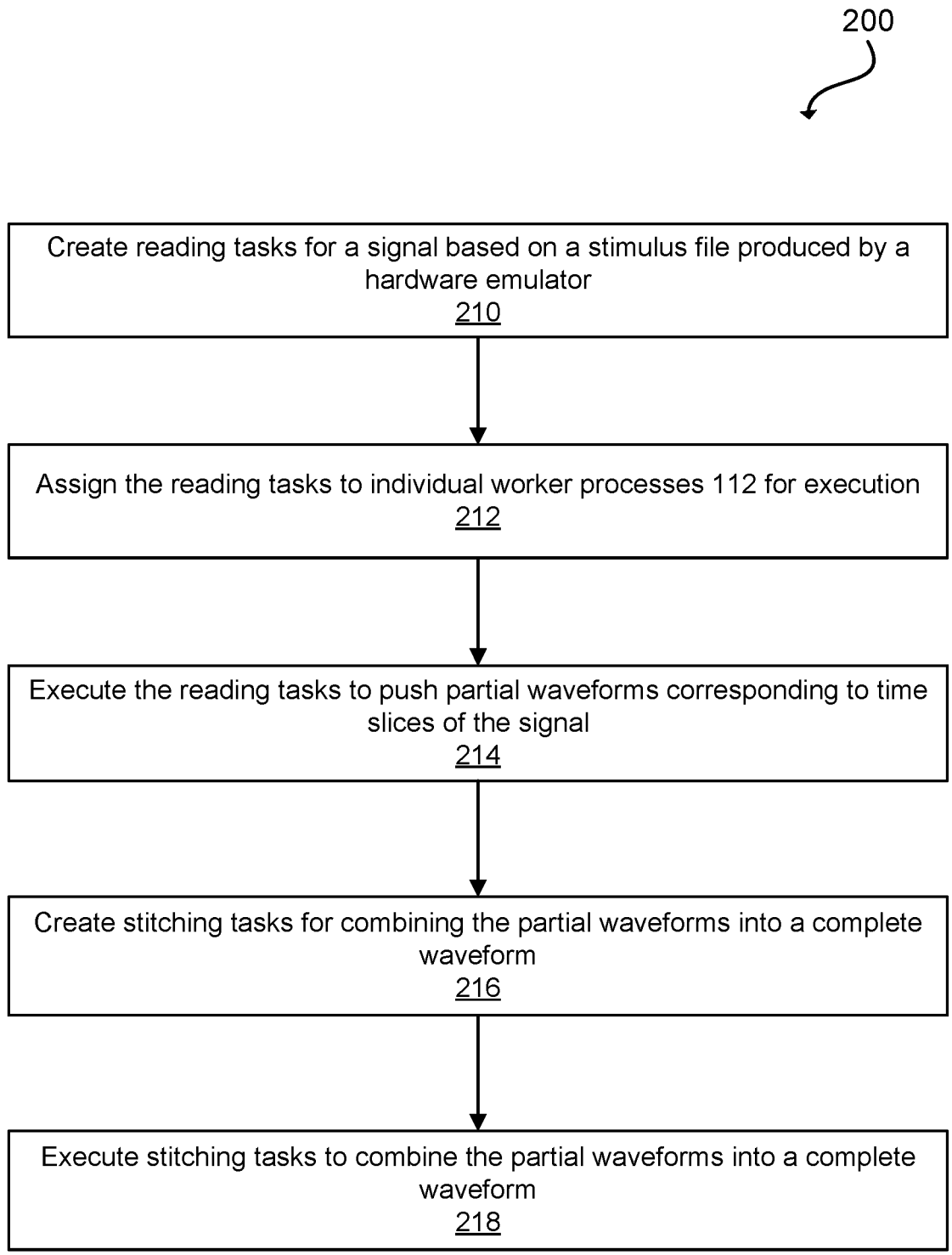
FIG. 2 depicts a flowchart of a process for providing a waveform produced by a hardware emulator to a data store in accordance with some embodiments of the present disclosure.

FIG. 2 depicts a flowchart of a process 200 for providing a waveform produced by a hardware emulator to a data store. The process 200 is discussed as being performed by the waveform reading system 100, although other types of computing systems and devices may be used. The process 200 may include a greater or fewer number of steps, and steps may be performed in different orders.

A master process 106 creates 210 reading tasks based on a stimulus file produced by an emulator or some other type of computing device. The stimulus file may include signals generated by multiple FPGAs of the emulation system 102. The master process 106 may define multiple time slices for each signal. Each reading task processes one time slice of one signal.

The master process 106 assigns 212 the reading tasks to individual worker processes 112 for execution. The reading tasks may be assigned to the worker processes 112 in various ways. For example, the reading tasks may be assigned to worker processes 112 by time slice across multiple waveforms. The reading tasks may be evenly distributed across multiple worker processes 112, or there may be an uneven distribution. In one example, a single worker process 112 may execute all the reading tasks. In some embodiments, the master process 106 does not assign the reading tasks. Individual worker processes 112 may select their reading tasks from a pool of reading tasks generated by the master process 106.

The worker processes 112 execute 214 the reading tasks to push partial waveforms corresponding to time slices of the signal to a data store 122. Each reading task includes reading a time slice of a signal from a stimulus file, and pushing a partial waveform corresponding with the time slice of the signal to the data store 122. Each reading task may include processing multiple signals concurrently. For example, the worker process 112 is not limited to reading a single signal at a time and pushing a single partial waveform at a time to the data store 122. The worker process 112 may read multiple signals for a time-slice concurrently and push the partial waveforms for each of the signals concurrently to the data store 122.

In some embodiments, executing each reading task includes sequentially reading different temporal portions of a time slice from the stimulus file into a buffer for the worker process as waveform segments, and pushing the waveform segments from the buffer to the data store 122. Each waveform segment may be pushed from the buffer to the data store responsive to the amount of data read into the buffer for each waveform segment reaching a threshold data size. In some embodiments, the threshold data size is reached when the amount of data read into the read buffer 116 exceeds the threshold data size within a tolerance limit.

For example, when the amount of data read into the read buffer 116 for a first waveform segment reaches the threshold data size, a worker process 112 determines a head portion, body portion, and tail portion of the first waveform segment. The worker process 112 pushes the body portion of the first waveform segment to the data store 122 and stores the head and tail portions of the first waveform segment within the stitching buffer 120. The first waveform segment is flushed from the read buffer 116, and a second waveform segment is read from the stimulus file into the read buffer 116. When the amount of data read into the read buffer 116 for the second waveform segment reaches the threshold data size, the worker process 112 determines a head portion, a body portion, and a tail portion of the second waveform segment. The worker process 112 pushes the body portion of the second waveform segment to the data store 122 and provides the head portion and the tail portion of the second waveform segment to the stitching buffer 120. The worker process 112 modifies the tail portion of the first waveform segment and the head portion of the second waveform segment to indicate a temporal order of the first and second waveform segments. As such, the tail portion of an earlier waveform segment is linked to the head portion of a later waveform segment, and so forth for each of the adjacent waveform segments of the waveform. The worker process 112 then pushes the modified head and tail portions to the data store 122. The head and tail of each partial waveform, which may include all portions of the partial waveform except the head portion of the first waveform segment of the partial waveform and the tail portion of the last waveform segment of the partial waveform, may be stored separately from the bodies of the partial waveforms in the data store 122.

The master process 106 creates 216 stitching tasks for combining the partial waveforms into a complete waveform. The master process 106 may assign the stitching tasks to individual worker processes 112 for execution. Each stitching task results in two partial waveforms being stitched together to indicate a temporal order.

The worker processes 112 execute 218 stitching tasks to combine the partial waveforms into the complete waveform. The stitching tasks include pulling the heads and tails of the partial waveforms from the data store 122, modifying the heads and tails to indicate a temporal order of the partial waveforms, and pushing the modified heads and tails back to the data store 122. Only the head and tails of the partial waveforms need to be pulled from the data store 122 for the stitching tasks, and the bodies of the partial waveforms are not pulled from the data store 122. The heads and tails of the partial waveforms may be stored separately from the bodies of the partial waveforms in the data store 122 to facilitate the data transfers used in the stitching tasks. By transferring the heads and tails without the bodies of the partial waveforms for the stitching tasks, the stitching tasks have improved runtime scaling. In some embodiments, the stitching tasks are executed by the master process 106.

Figure 3:
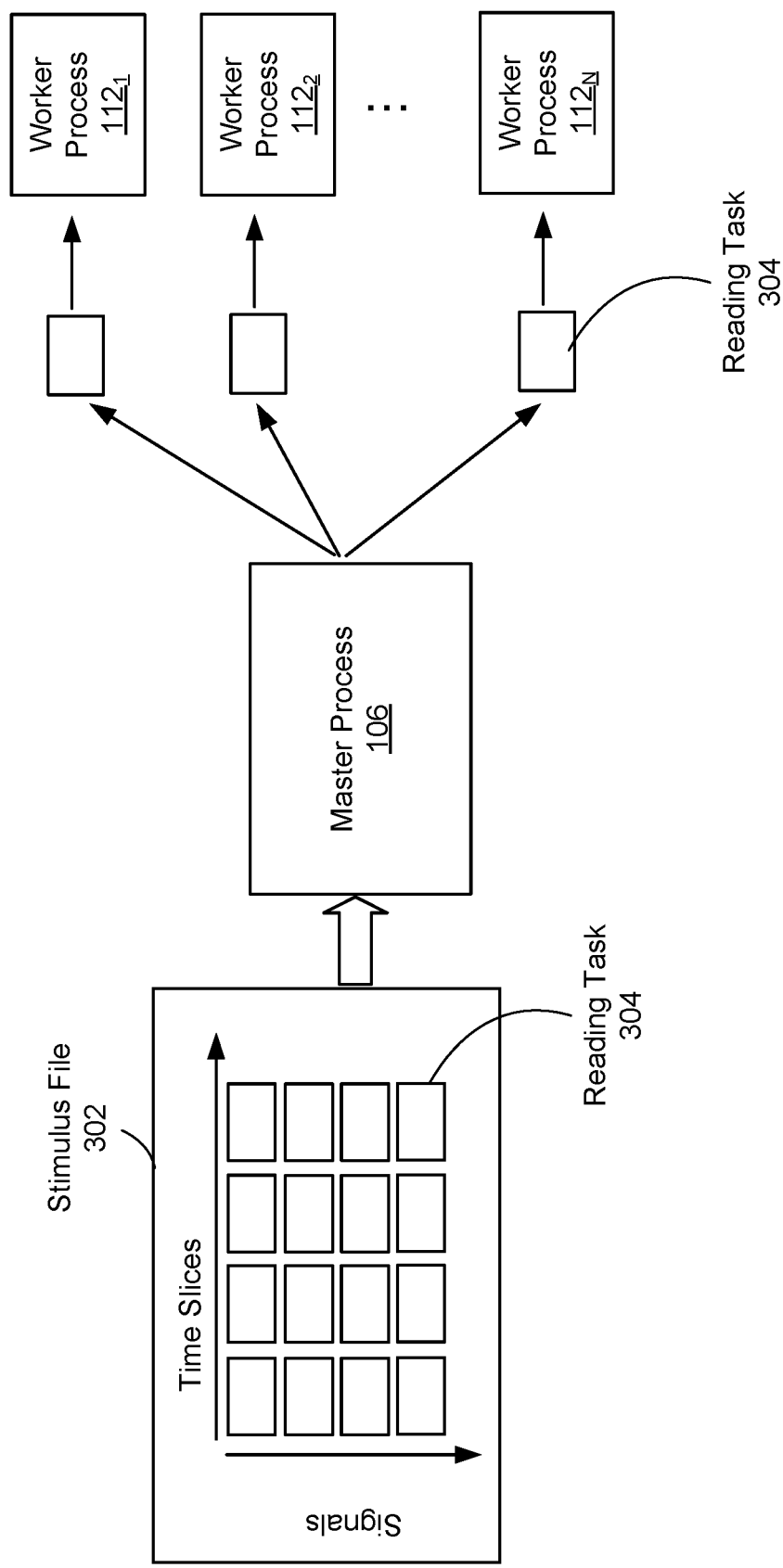
FIG. 3 depicts an assignment of reading tasks across multiple worker processes in accordance with some embodiments of the present disclosure.

FIG. 3 depicts an assignment of reading tasks across multiple worker processes. A stimulus file 302 includes multiple signals that are read from the stimulus file to the data store 122. In FIG. 3, the signals are divided across a signal dimension and a time slice dimension. Each waveform generated via reading and stitching tasks corresponds with a signal generated by the emulation system. Each signal may include data values over time, as shown in FIG. 10. Each signal is separated into multiple time slices, where each time slice is a portion of the overall duration of the signal. The master process 106 creates reading tasks 304, each corresponding with one time slice for one of the signals. The reading tasks 304 are executed by the worker processes $112_1$ through $112_N$. Each worker process 112 executes one or more reading tasks 304 independently of the other worker processes 112. The master process 106 may assign the reading tasks 304 to the worker processes 112, or otherwise make the created reading tasks 304 available for execution by the worker processes 112. While FIG. 3 shows one each worker process 112 executing one reading task, multiple reading tasks can be assigned to a single worker process 112. The number of reading tasks and the number of worker processes 112 may be independent. For example, a single worker process 112 can execute all the reading tasks.

Figure 4:
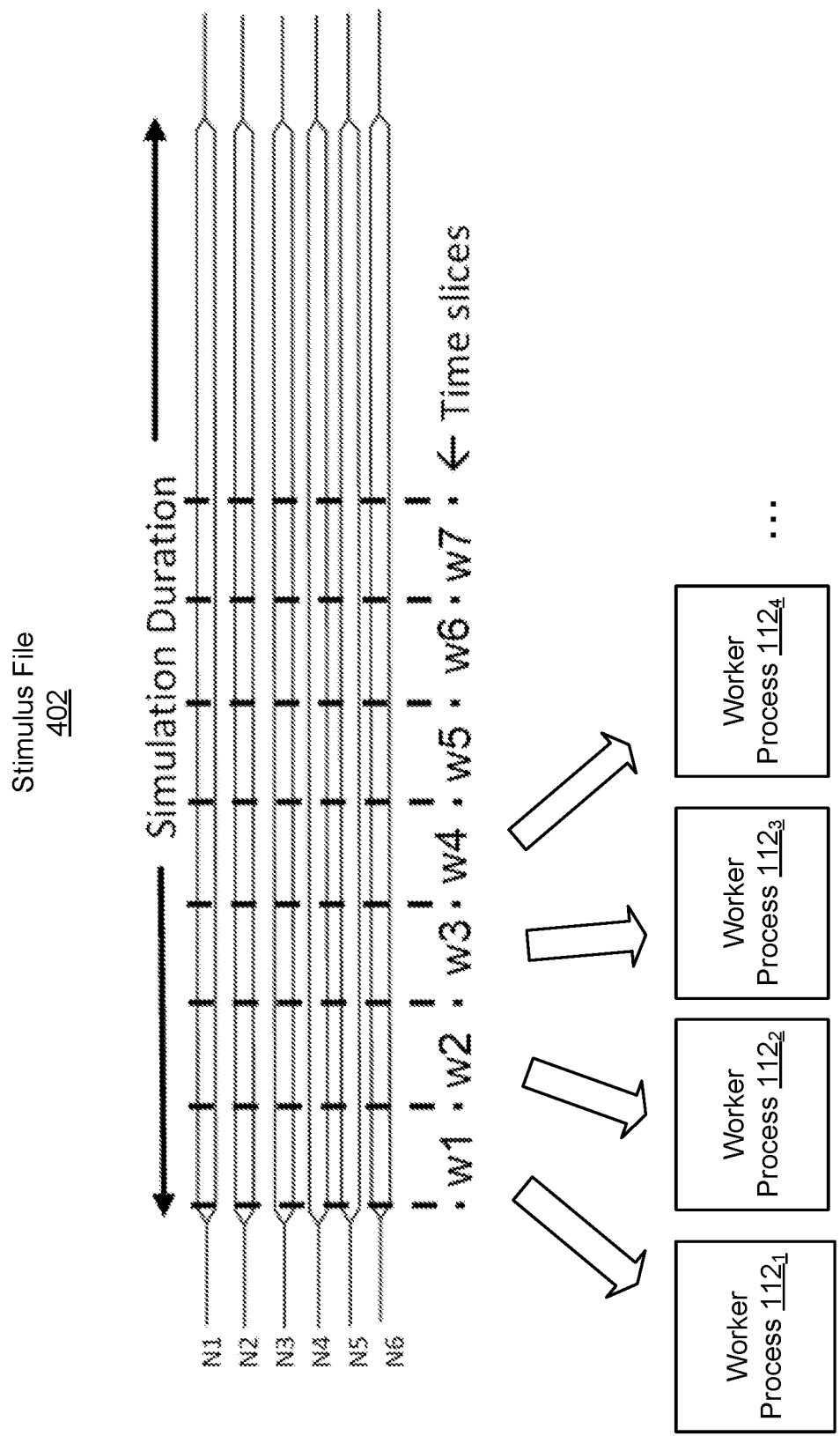
FIG. 4 depicts an assignment of reading tasks for multiple signals to worker processes according to time slice in accordance with some embodiments of the present disclosure.

FIG. 4 depicts an assignment of reading tasks for multiple signals to worker processes according to time slice. The stimulus file 402 includes signals N1 through N6. The signals N1 through N6 may be waveforms generated by one FPGA of the emulation system 102. Each of the signals N1 through N6 are separated into multiple time slices, as shown for time slices w1 through w7. Each time slice represents a reading task. The reading tasks are assigned to worker processes 112 by time slice across multiple signals. For example, the worker process $112_1$ executes the reading task for time slice w1, which includes all of the signals N1 through N6, the worker process $112_2$ executes the reading task for time slice w2 for each of signals N1 through N6, the worker process $112_3$ executes the reading task for time slice w3 for each of signals N1 through N6, and the worker process $112_4$ executes the reading task for time slice w4 for each of signals N1 through N6. The reading tasks for each of the time slices w5, w6, w7, etc. may also be similarly assigned to one of the worker processes 112. The stimulus file 402 may include signals for multiple FPGAs of the emulation system 102. The reading tasks for each of the FPGAs may be assigned as shown for the signals N1 through N6.

Figure 5A:
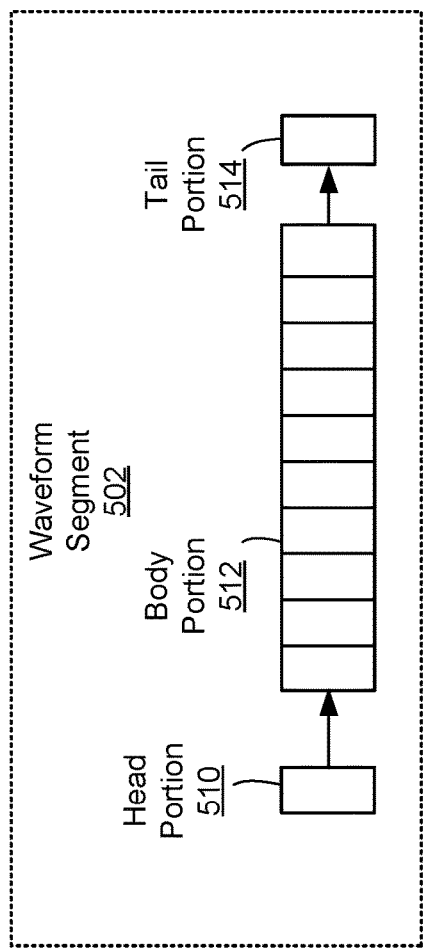
FIG. 5A depicts a waveform segment in accordance with some embodiments of the present disclosure.

FIG. 5A depicts a waveform segment 502. The waveform segment 502 includes a head portion 510, a body portion 512, and a tail portion 514 that are linked together. For example, the head portion 510 points to the body portion 512, and the body portion 512 points to the tail portion 514. The head portion 510 and tail portion 514 each have a smaller data size than the body portion 512. In some embodiments, waveforms in the data store 122 are stored using {Key, Data} pairs. Each waveform segment is stored like a linked list of atomic data-structure. Each waveform segment has two components including (i) the body portion and (ii) the head and tail portions. Each of the components are stored in a separate {Key, Data} pair.

Figure 5B:
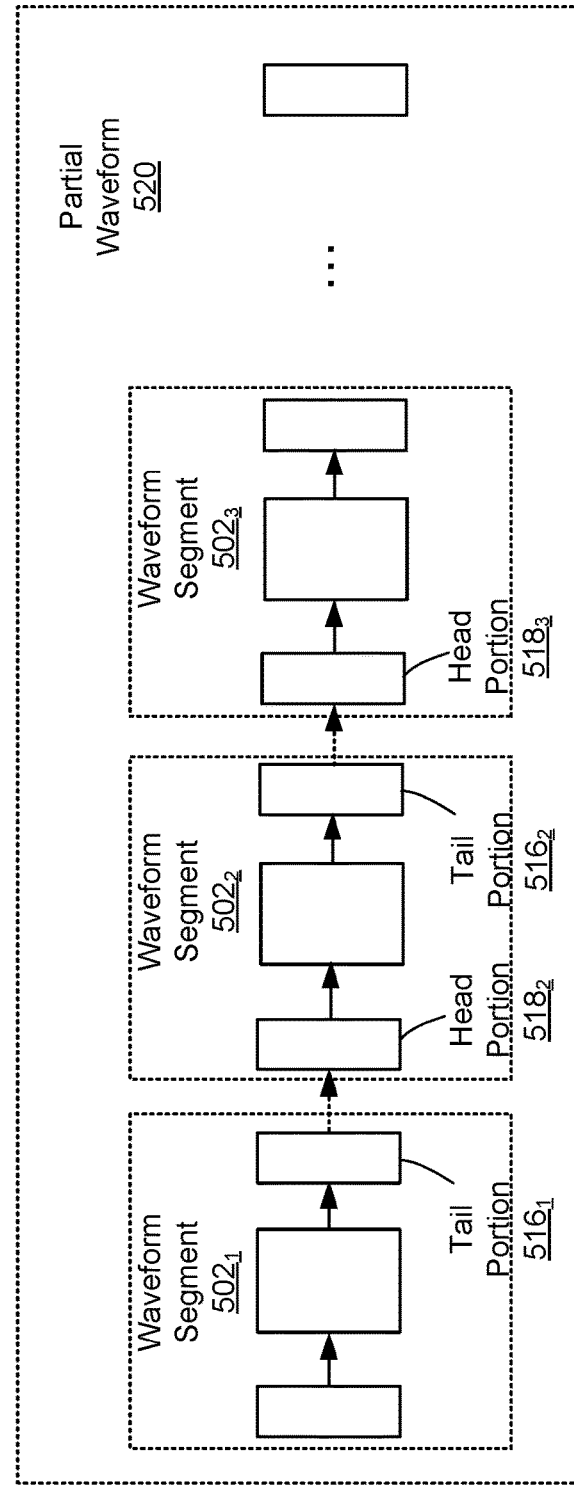
FIG. 5B depicts a partial waveform that includes stitched waveform segments in accordance with some embodiments of the present disclosure.

FIG. 5B depicts a partial waveform 520 that includes stitched waveform segments 502. The waveform segment $502_1$ is temporally the first waveform segment of the partial waveform 520, followed by the waveform segment $502_2$, and then the waveform segment $502_3$, and so forth. These waveform segments 502 are stitched together to form the partial waveform 520 of a reading task via modification of tail portions 516 and head portions 418. For example, the tail portion $516_1$ of the waveform segment $502_1$ points to the head portion $518_2$ of the waveform segment $502_2$, the tail portion $5162$ of the waveform segment $502_2$ points to the head portion $518_3$ of the waveform segment $502_3$, and so forth to link each of the waveform segments 502 of the partial waveform 520.

Figure 6:
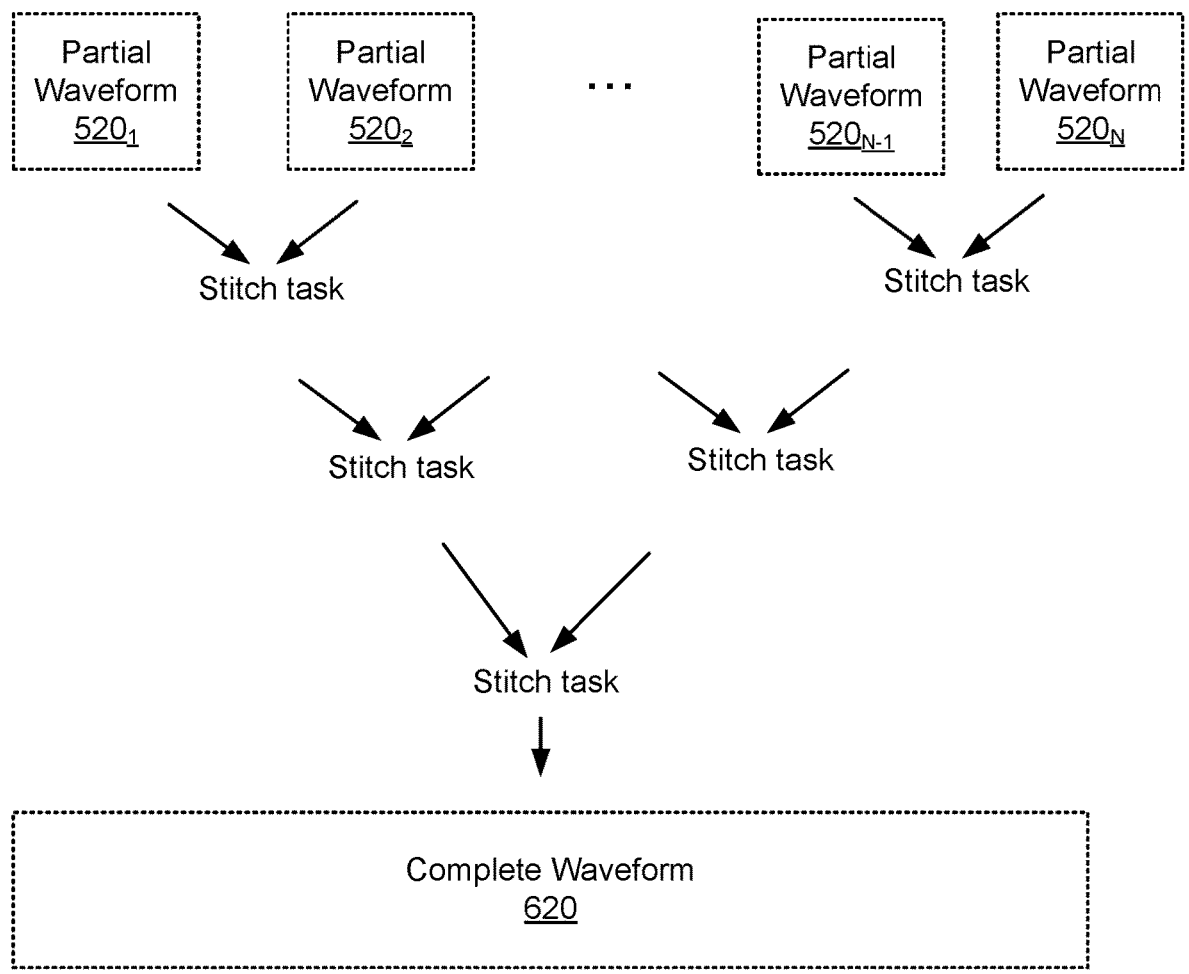
FIG. 6 depicts a complete waveform that includes stitched partial waveforms in accordance with some embodiments of the present disclosure.

FIG. 6 depicts a complete waveform 620 that includes stitched partial waveforms 520. The complete waveform 620 includes a temporal sequence of partial waveforms $520_1$ through $520_N$. Each stitching task may stitch together adjacent partial waveforms 502 or adjacent groups of partial waveforms. For example, a first level of stitching tasks combines adjacent pairs of partial waveform, as shown by partial waveform $520_1$ being stitched with partial waveform $520_2$. The stitching may include pointing the tail portion of the last waveform segment of the partial waveform $520_1$ (e.g., which is the tail of the partial waveform $520_1$) to the head portion of the first waveform segment of the partial waveform $520_2$ (e.g., which is the head of the partial waveform $520_2$). Similarly, the partial waveform $520_{N-1}$ is stitched with the partial waveform $520_N$. In a second level of stitching tasks, adjacent groups of stitched partial waveforms from the first level are stitched together. Additional levels of stitching tasks may be executed until all the partial waveforms 520 are stitched together to form the complete waveform 620.

Figure 7:
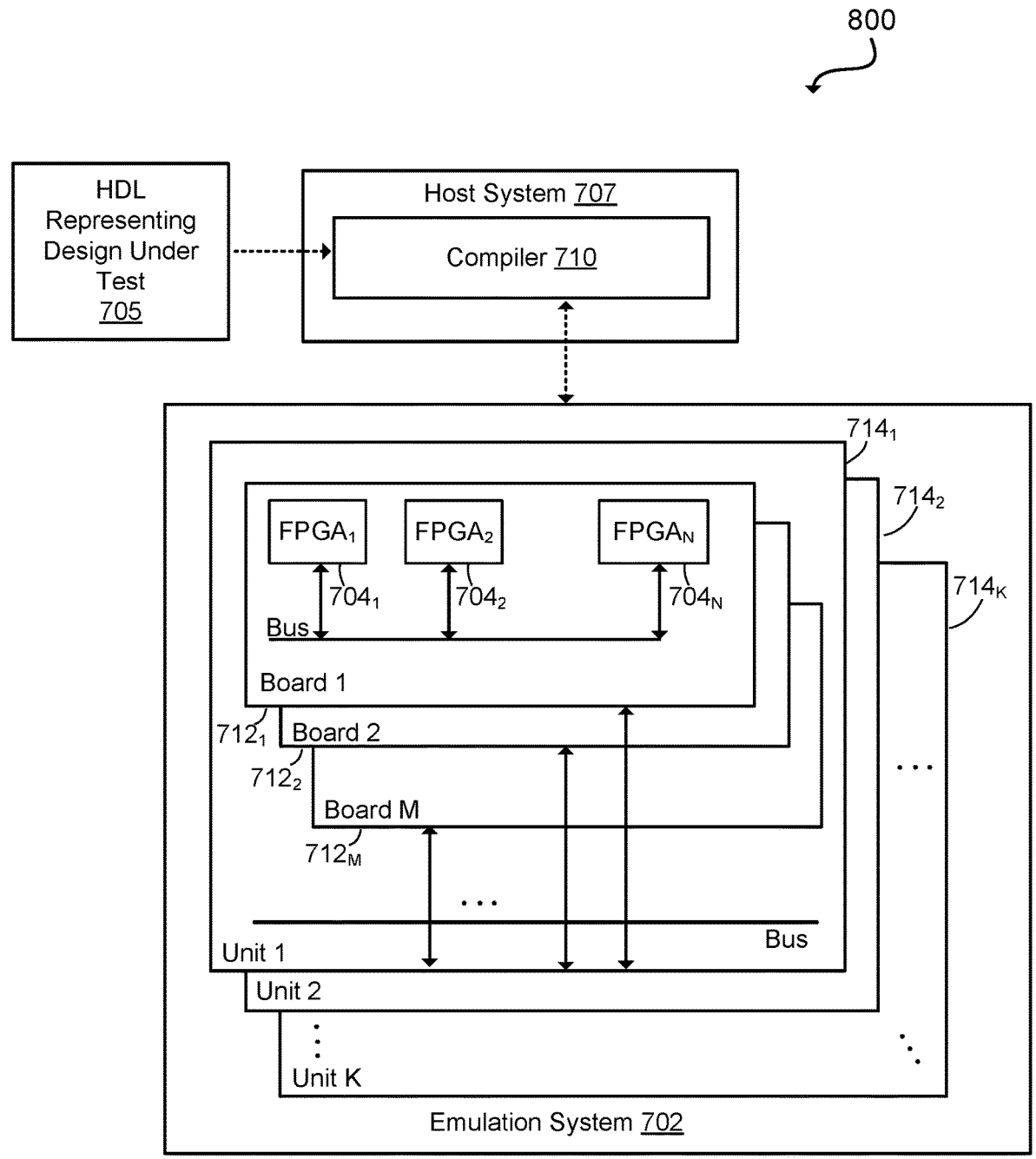
FIG. 7 depicts an abstract diagram of an example emulation system in accordance with some embodiments of the present disclosure.

FIG. 7 depicts an abstract diagram of an example emulation environment 700. An emulation environment 700 may be configured to verify the functionality of the circuit design. The emulation environment 700 may include a host system 707 (e.g., a computer that is part of an EDA system) and an emulation system 702 (e.g., a set of programmable devices such as Field Programmable Gate Arrays (FPGAs) or processors). The host system generates data and information by using a compiler 710 to structure the emulation system to emulate a circuit design. A circuit design to be emulated is also referred to as a Design Under Test ('DUT') where data and information from the emulation are used to verify the functionality of the DUT.

The host system 707 may include one or more processors. In the embodiment where the host system includes multiple processors, the functions described herein as being performed by the host system can be distributed among the multiple processors. The host system 707 may include a compiler 710 to transform specifications written in a description language that represents a DUT and to produce data (e.g., binary data) and information that is used to structure the emulation system 702 to emulate the DUT. The compiler 710 can transform, change, restructure, add new functions to, and/or control the timing of the DUT. In some embodiments, the host system 707 executes the master process 106 and one or more worker processes 112.

The host system 707 and emulation system 702 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 707 and emulation system 702 can exchange data and information through a third device such as a network server.

The emulation system 702 includes multiple FPGAs (or other modules) such as FPGAs $704_1$ and $704_2$ as well as additional FPGAs to $704_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 702 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $704_1$-$704_N$ may be placed onto one or more boards $712_1$ and $712_2$ as well as additional boards through $712_M$. Multiple boards can be placed into an emulation unit $714_1$. The boards within an emulation unit can be connected using the backplane of the emulation unit or any other types of connections. In addition, multiple emulation units (e.g., $714_1$ and $714_2$ through $714_K$) can be connected to each other by cables or any other means to form a multi-emulation unit system.

For a DUT that is to be emulated, the host system 700 transmits one or more bit files to the emulation system 702. The bit files may specify a description of the DUT and may further specify partitions of the DUT created by the host system 707 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 707 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

A host system 707, the compiler 710, or one or more other computing devices may include sub-systems such as, but not limited to, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The waveform sub-system generates waveforms using the traced signals and stores the waveforms in the storage sub-system. The waveform sub-system may execute the master process 106 and the worker processes 112. If a circuit designer requests to view a waveform of a signal traced during an emulation run, the host system retrieves the waveform generated from the signal from the storage sub-system. The waveform sub-system displays a plot of the waveform. For one or more signals, when the signals are received from the emulator, the waveform sub-system can automatically generate the waveforms of the signals using the reading and stitching tasks.

Figure 8:
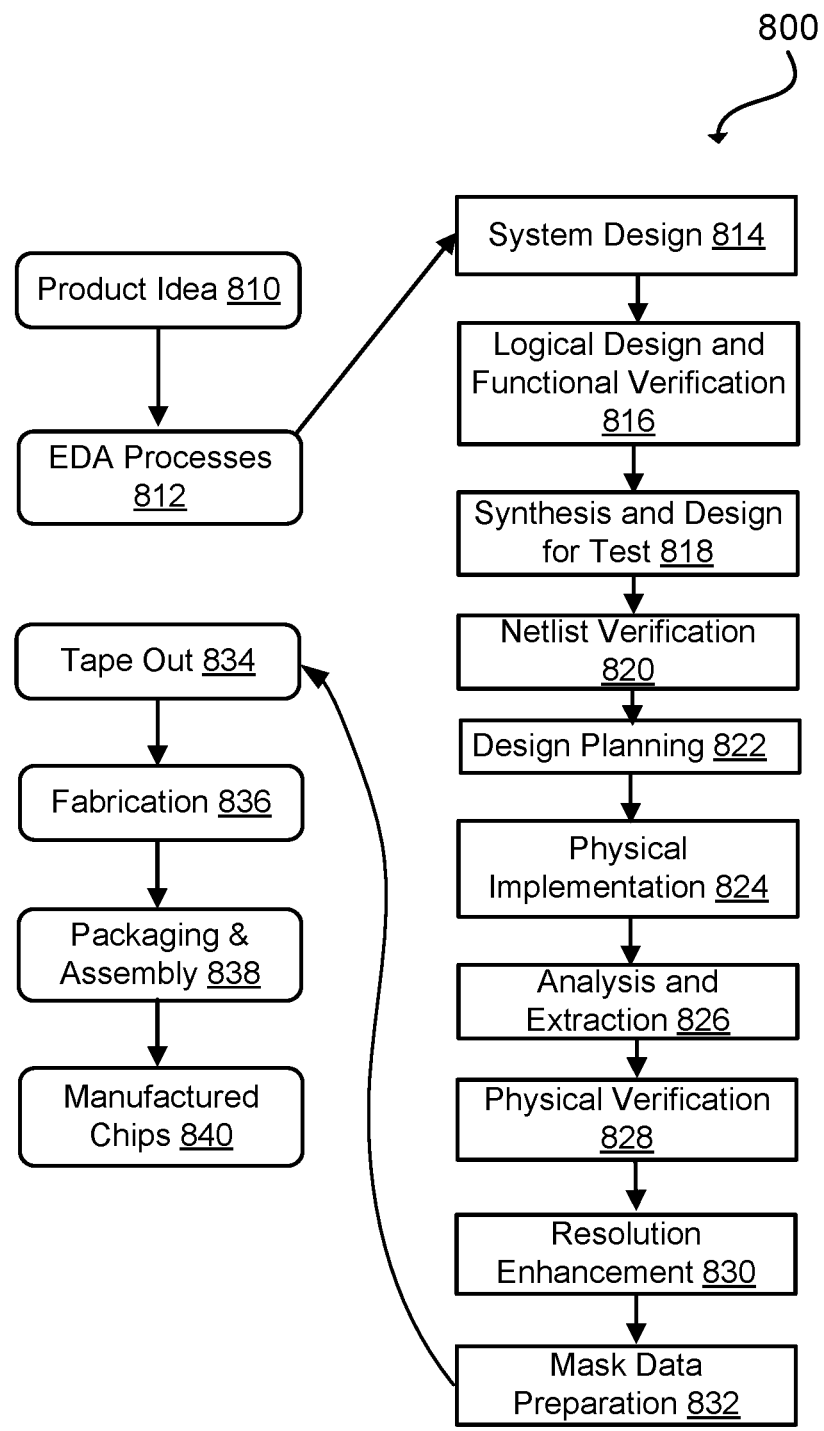
FIG. 8 depicts a flowchart of various processes used during the design and manufacture of an integrated circuit in accordance with some embodiments of the present disclosure.

FIG. 8 depicts an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 8. The processes described by be enabled by EDA products (or tools).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9, or host system 707 of FIG. 7) may be used to store the programs and data structures that are used by some or all of the EDA products described herein, and products used for development of cells for the library and for physical and logical design that use the library.

Figure 9:
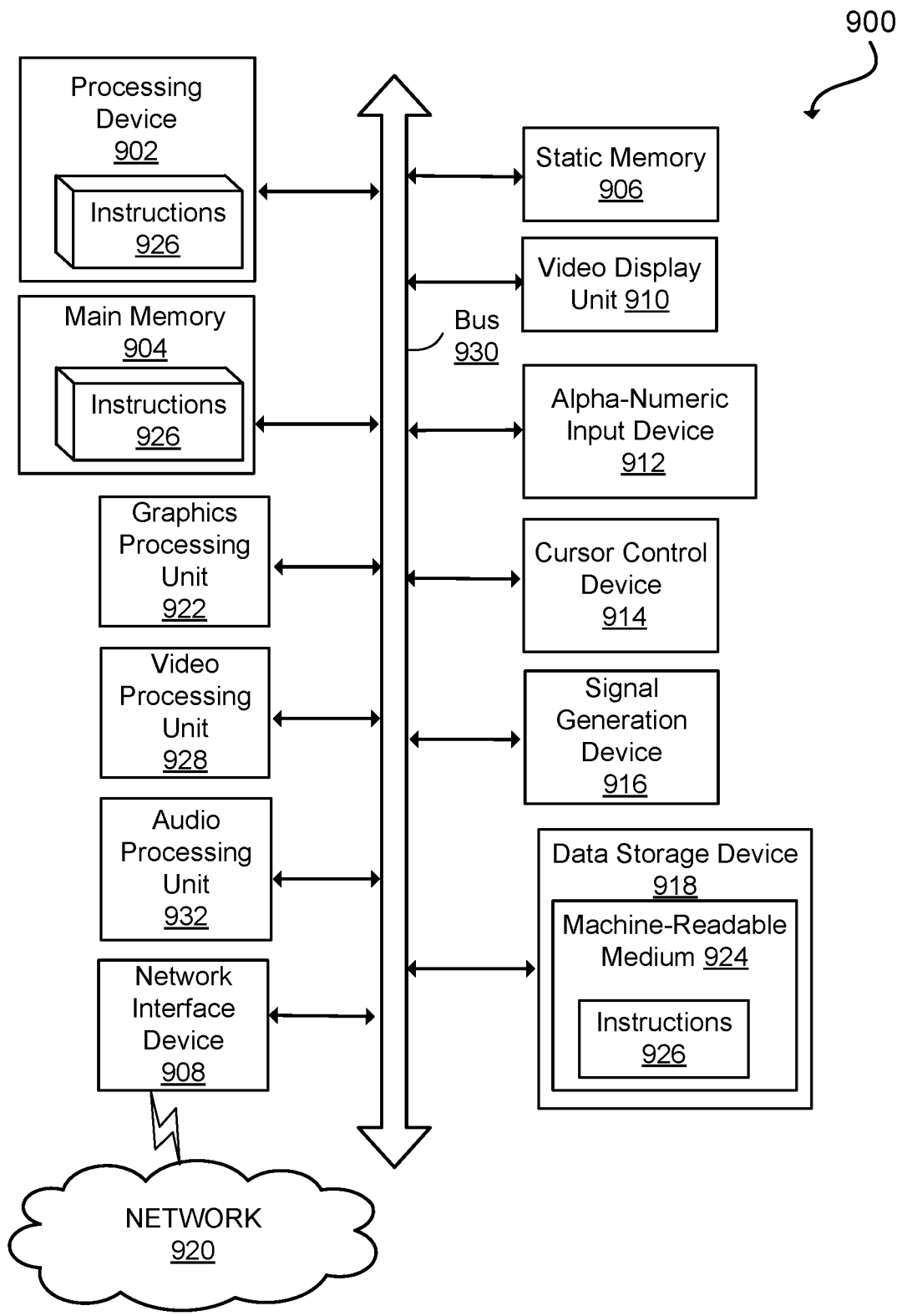
FIG. 9 depicts an abstract diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    generating, by a processing device, reading tasks, wherein the reading tasks comprise:
        reading time slices of a signal from a stimulus file; and
        pushing partial waveforms corresponding to the time slices of the signal to a data store, each partial waveform comprising a head and a tail that each has a smaller data size than an entirety of the partial waveform;
    making the reading tasks available to worker processes for execution;
    generating stitching tasks for stitching together the heads and tails of the partial waveforms pushed to the data store according to a temporal order of the partial waveforms; and
    making the stitching tasks available to worker processes for execution.

2. The method of claim 1 wherein making the reading tasks available to worker processes for execution comprises: assigning the reading tasks to worker processes for execution.

3. The method of claim 2 wherein assigning the reading tasks to worker processes for execution comprises:
    placing the reading tasks into a queue; and
    assigning the reading tasks to worker processes from the queue.

4. The method of claim 1 wherein making the reading tasks available to worker processes for execution comprises: distributing the reading tasks evenly across the worker processes.

5. The method of claim 1 wherein making the reading tasks available to worker processes for execution comprises: placing the reading tasks into a pool, wherein the worker processes obtain reading tasks from the pool.

6. The method of claim 1 wherein the stitching tasks comprise:
    pulling the heads and tails of the partial waveforms from the data store;
    modifying the heads and tails to indicate a temporal order of the partial waveforms; and
    pushing the modified heads and tails back to the data store.

7. The method of claim 6 wherein generating stitching tasks is performed after the worker processes have executed the reading tasks.

8. The method of claim 1 further comprising:
    tracking stitching required at boundaries between time slices.

9. The method of claim 1 further comprising:
    performing the stitching tasks that stitch together the partial waveforms pushed to the data store.

10. A system comprising:
    a memory storing instructions; and
    a processing device, coupled with the memory and to execute the instructions, the instructions when executed cause the processing device to generate one or more worker processes that execute reading tasks, wherein the reading tasks comprise:
        reading time slices containing a plurality of signals from a stimulus file; and
        pushing partial waveforms to a data store, each partial waveform corresponding to one time slice of one signal and comprising a head and a tail that each has a smaller data size than an entirety of the partial waveform; and
    the worker processes further execute stitching tasks for stitching together the heads and tails of the partial waveforms pushed to the data store according to a temporal order of the partial waveforms.

11. The system of claim 10 wherein the worker processes executing reading tasks further comprise:
    subdividing partial waveforms into waveform segments; and
    pushing the waveform segments to the data store.

12. The system of claim 11 wherein the worker processes executing reading tasks further comprise:

reading a first waveform segment from the stimulus file;
pushing a body of the first waveform segment to the data store while retaining a head and a tail of the first waveform segment;
reading a second waveform segment from the stimulus file; and
stitching a head or tail of the first waveform segment to a tail or head of the second waveform segment.

13. The system of claim 10 wherein the stimulus file does not contain data values for all signals at all times, and the worker processes executing reading tasks further comprise:
generating data values for the partial waveforms at times for which the stimulus file does not contain data values.

14. The system of claim 10 wherein the worker processes comprise a reader process, a read buffer, a stitching process and a stitching buffer.

15. The system of claim 10 wherein the reading tasks are not executed by the worker processes according to a temporal order of the time slices.

16. A non-transitory computer readable medium comprising stored instructions, which when executed by a processing device, cause the processing device to:
execute reading tasks that read time slices of a signal from a stimulus file and push partial waveforms corresponding to the time slices of the signal to a data store, each partial waveform comprising a head and a tail; and
execute stitching tasks that stitch together the heads and tails of the partial waveforms according to a temporal order of the partial waveforms.

17. The non-transitory computer readable medium of claim 16 wherein the partial waveforms are stored in the data store in a signal-ordered format.

18. The non-transitory computer readable medium of claim 17 wherein the stimulus file stores the signals in a time-ordered format.

19. The non-transitory computer readable medium of claim 16 wherein the partial waveforms are stored in the data store using {Key, Data} pairs.

* * * * *